United States Patent

McClain

Patent Number: 5,358,013
Date of Patent: Oct. 25, 1994

[54] DEFLECTION-RESISTANT SAFETY FLANGE FOR INTEGRALLY-FLANGED DUCT SECTIONS

[75] Inventor: Lamont R. McClain, St. Louis, Mo.

[73] Assignee: Engel Industries, Inc., St. Louis, Mo.

[21] Appl. No.: 126,491

[22] Filed: Sep. 24, 1993

[51] Int. Cl.⁵ .................. F16L 23/00; F16L 25/00
[52] U.S. Cl. .................... 138/109; 138/155; 138/120; 138/DIG. 4; 285/405; 285/363
[58] Field of Search ......... 138/109, 155, 120, DIG. 4, 138/DIG. 10, 177, 178; 285/405, 406, 424, 332, 334.5, 363

[56] References Cited

U.S. PATENT DOCUMENTS

| | | | |
|---|---|---|---|
| 641,580 | 1/1900 | Cummins | 285/406 X |
| 2,260,221 | 10/1941 | Gray | 138/DIG. 4 X |
| 2,752,950 | 7/1956 | Coulters | 285/406 |
| 4,218,079 | 8/1980 | Arnoldt | 285/363 X |
| 4,351,390 | 9/1982 | Argyle et al. | 285/364 X |
| 4,447,079 | 5/1984 | Sullivan | 285/363 |
| 4,466,641 | 8/1984 | Fischer et al. | 285/363 |
| 4,579,375 | 4/1986 | Heilman et al. | 285/406 |
| 4,739,802 | 4/1988 | Meinig | 138/DIG. 10 X |
| 4,865,365 | 9/1989 | Meinig | 138/109 X |
| 5,103,872 | 4/1992 | Jyh-Long | 138/155 X |

OTHER PUBLICATIONS

HVAC Duct Construction Standards, Metal and Flexible, First Ed. 1985 Published by: Sheet Metal and Air Conditioning Contractors National Association, Inc., Vienna, Va. 22180, pp. 1–25; Table 1–12.

DW/141, Specification for Sheet Metal Ductwork, Low and High Velocity Pressure Air Systems, Published by: Heating and Ventilating Contractors' Association, 1977, pp. 16, 17 and 20; p. 16, FIG. 55; p. 17, FIGS. 58, 59 and 60; p. 20, FIG. 73.

*Primary Examiner*—David A. Scherbel
*Assistant Examiner*—Patrick F. Brinson
*Attorney, Agent, or Firm*—Jerome A. Gross

[57] ABSTRACT

Modifying that type of integral flange outstanding from a sheet metal duct characterized by an outstanding first width of sheet metal and a second substantially equal width bent reversedly back to extend at 180° from the first, in the present flange a sheet edge margin is bent reversedly back and inwardly between the second and first such widths. As compared to prior art flanges, this results in substantially lessened deflections under internal duct pressures without appreciable increase in sheet metal used. An added advantage is that the sheet metal edge is positioned so that it cannot endanger workmen's hands.

2 Claims, 2 Drawing Sheets

DEFLECTION-RESISTANT SAFETY FLANGE FOR INTEGRALLY-FLANGED DUCT SECTIONS

TECHNICAL FIELD

This invention relates to flanges formed integrally at the ends of rectangular sheet metal duct sections, and specifically to a flange of improved design, which provides increased resistance to deflection from internal positive or negative pressures, easier manufacture, and safety in handling.

BACKGROUND ART

The Sheet Metal and Air Conditioning Contractors National Association (SMACNA) provides deflection criteria for certain proprietary flange systems; compliance is to be proved by testing, rather than by mathematical calculation. A flange design for which criteria have been established and recognized by the Association is known as the T-24. Competing manufacturers who have their own patented systems may appropriately test them as against the T-24 test results.

The T-24 flange consists of a first portion bent perpendicular to the sheet metal surface, a second portion bent back parallel to the surface, and a third portion bent reversedly outward and back against the outer surface of the second portion.

Proprietary flange designs patented within the last decade have added portions of sheet metal at or adjacent to the duct surface, rather than to the outstanding edge of the flange. Thus, according to U.S. Pat. No. 4,466,641 issued to The Lockformer Co., the flange structure (herein called the "TDC flange") includes a broad groove, indented from the duct surface immediately adjacent to the outstanding leg of the flange. In a competing flange design called the "TDF flange" and shown in U.S. Pat. No. 4,579,375 to Engel Industries, Inc., a bead is formed in the duct surface spaced forwardly of the outstanding leg of the flange.

According to structural engineering theory which has conventionally been accepted in designing sheet metal products, such additional material (provided by the groove in the first instance and by the bead in the second) would serve, along with a part of the flat sheet metal adjacent, as the bottom flange of a virtual "I" beam, adding to its combined bending resistance. Thus, these recently patented constructions suggest that if material is to be added to strengthen the integral flange arising from a sheet metal duct surface, it should be added at or adjacent to that surface.

SUMMARY OF THE INVENTION

I have found that for purposes of meeting the deflection test criteria applicable to sheet metal ducts having integral flanges, it is more advantageous to add the sheet metal material at the extreme outstanding portions of the integral flanges. In the present instance, the added material constitutes a hem, adjacent to the material's edge, which hem and edge are safely accommodated between the inner and outer portions of a T-24 type flange. Such safety is important; nearly 50% of duct sections may have roughly cut or nibbled edges which endanger the hands of workmen who must assemble and install them. The new flange may be formed on a relatively simple progressive roll-forming machine whose construction will be obvious.

DESCRIPTION OF THE PREFERRED EMBODIMENT

Figure 1:
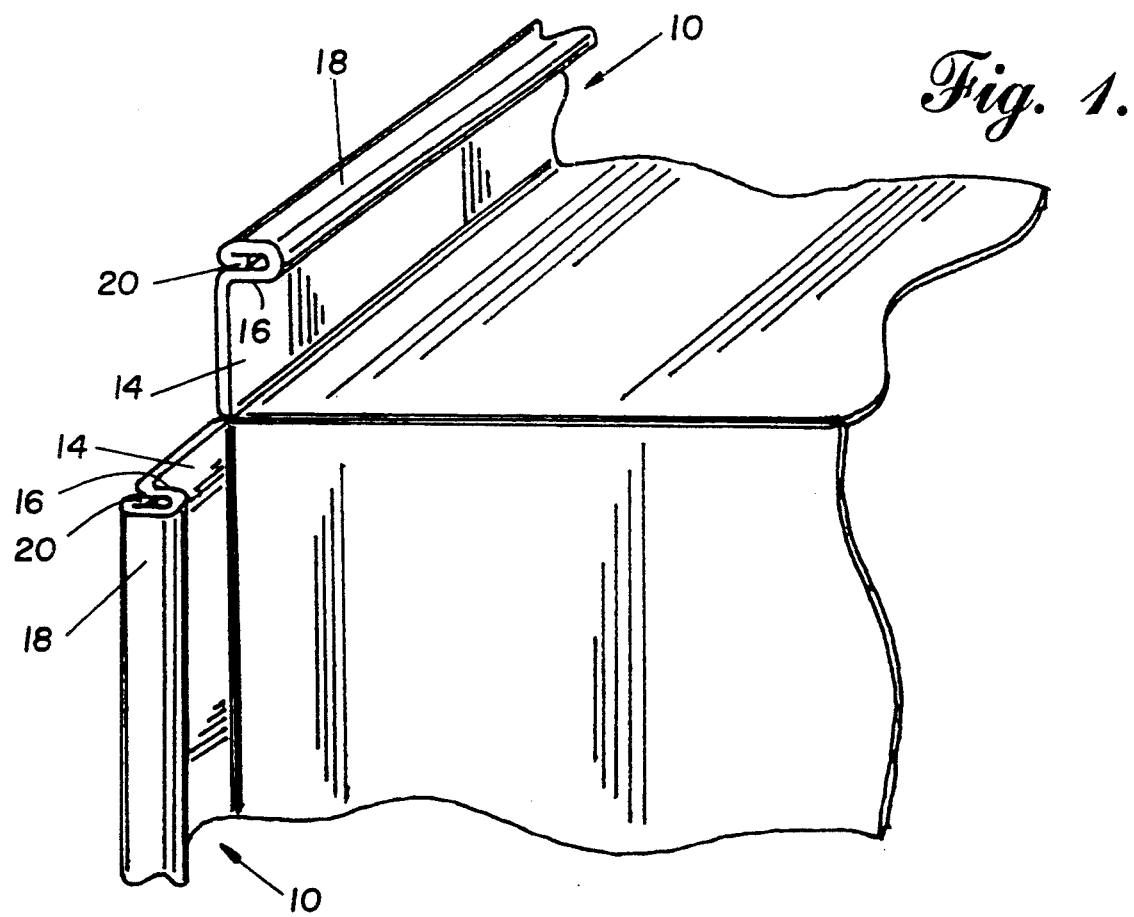
FIG. 1 is a perspective view of one corner of a duct section embodying the present invention.
Figure 2:
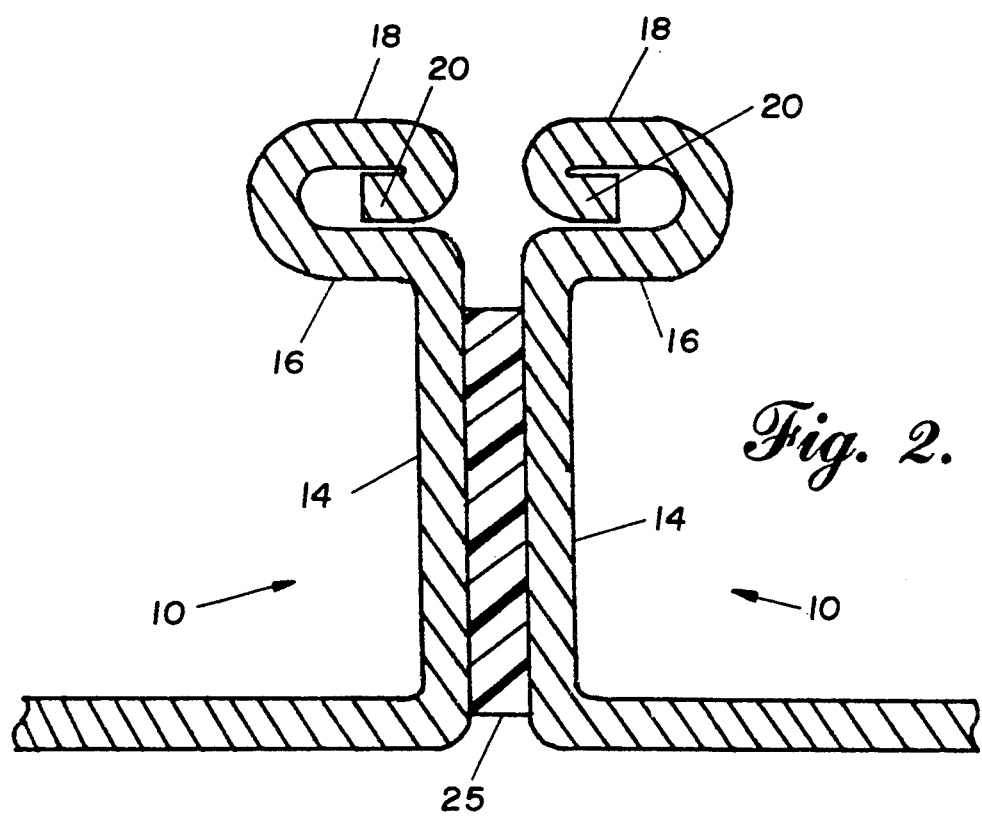
FIG. 2 is a sectional view, as seen at a typical top juncture of adjacent sections of ducts having flanges formed as in the present invention.
Figure 3:
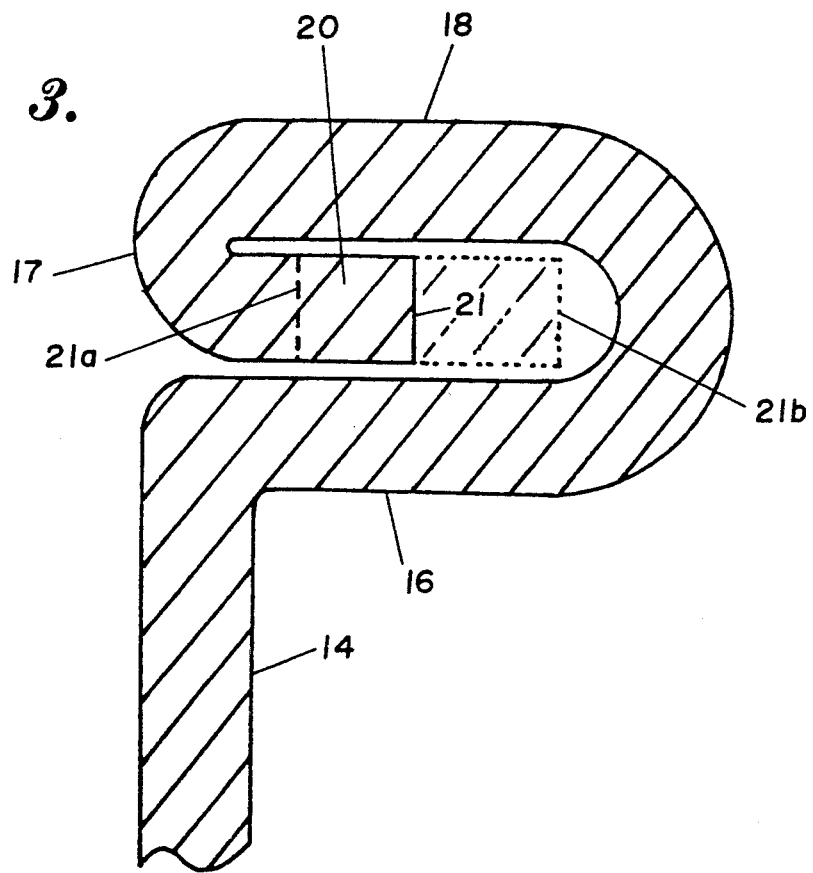
FIG. 3 is a greatly enlarged view of the upper flange of such a duct section.

Two adjacent end flanges of the present invention, generally designated 10, are shown in FIG. 2, the outer portion of such a flange is shown greatly enlarged in FIG. 3. The present flange includes a first flange portion 14 formed outward from and substantially perpendicular to the surface 10 of the duct section, and a second flange portion 16 adjoining the first and bent back to be substantially parallel to the duct section surface 10; the extent of the second flange portion 16 may be about 7/16" and in any event substantially less than that of the first flange portion. A third flange portion 18 is bent reversedly to the second portion, somewhat like that in the third flange portion 18' of FIG. 1(a); but is spaced from the second flange portion 16' not less than the thickness of the sheet metal from which the duct section is formed. A fourth flange portion 20, of somewhat adjustable extent, is bent reversed inward from the third flange portion 18 and presented substantially adjacent to the outer surface of the second flange portion 16. This fourth flange portion is the margin of the sheet metal from which the edge flange is formed; its edge 21 extends toward the inner surface of the first reverse bend 19.

It has been found that this new flange may be formed on conventional progressive roll-forming machines having as few as twelve roll stands, whose design is within the competence of roll forming engineers; in contrast to the more expensive 16-stand machines now used to form the TDF configuration.

In order to provide a basis for testing as against the prior art flange designated 4(c) hereafter described, the material in the integrally flanged duct sections were made, in accordance with the present invention to contain substantially the same amount of sheet metal material as in said prior flange 4(c), hereinafter described. As seen from FIG. 3, the amount of material utilized can be controlled by varying the fourth flange portion 20. Assuming the total flange width of 7/16", the length of the fourth flange portion 20 after its amount included in the reverse bend 17, may range in width from about ⅛", as shown by the dashed line 21a of FIG. 3, to approximately one-fourth inch, as shown by the dotted line 21b; while an intermediate width, shown by the solid line 21, will be approximately 3/16".

Prior Art Flanges

Figure 4A:
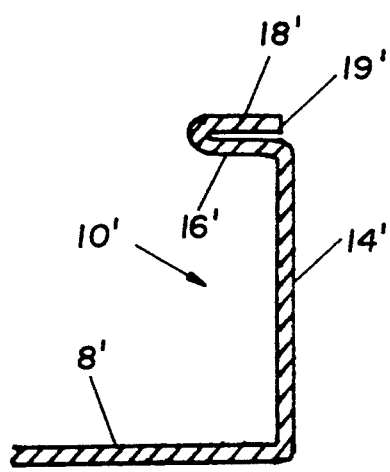
FIGS. 4(a), (b) and (c) show the prior art flanges known as T-24, TDC and TDF respectively.
Figure 4B:
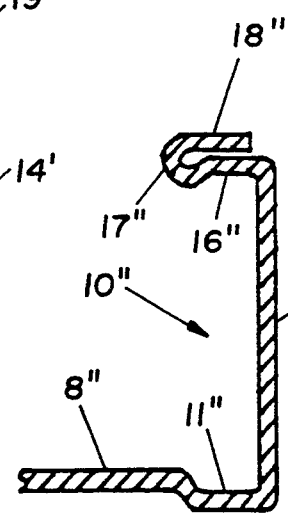

Prior art flanges are utilized integrally formed on the ends of duct sections in the same manner as shown in FIG. 4 of the present invention. FIG. 4(a) shows the cross-section of a standard T-24 flange. As shown, its first flange portion 14' is formed perpendicularly outward from the duct surface 8'. A second flange portion 16' is bent back substantially parallel to the surface portion 8' a somewhat lesser distance than the height of the flange portion 14', say 7/16". Commencing with a 180° reversed bend 17' a third flange portion 18' extends back the width of the second portion. The edge 19' of the third portion remains unfinished, and may be hazardous to handle, particularly if the duct section is a tapering one with cut or nibbled edges.

The second prior art flange here shown as FIG. 4, referred to as the TDC flange, includes a depressed or channel portion 11" formed in the duct surface 8" immediately forward of its outward-extending flange portion 14". From that portion, a second flange portion 16" is bent back parallel to the duct surface; this flange portion terminates in an inward-turned edge 17"; from it a third flange portion 18" is bent reversed outward and pressed substantially against the second flange portion 16". This likewise leaves a rough edge 19" which may endanger workmen's hands.

Figure 4C:
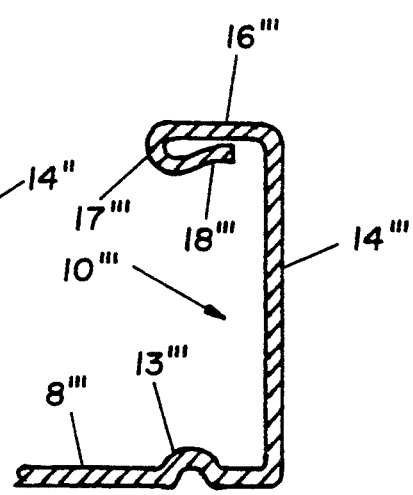

A third prior art flange shown in FIG. 4(c) and generally designated 10''', also known as TDF flange, contains a bead 13''' formed outward from the duct surface 8''' and spaced in advance of the first outstanding flange portion 14'''. From its outer extremity a second flange portion 16''' is bent so as to be parallel to the duct surface. From a reverse bend 19''' at its end, a third sheet metal spring flange 18''' is bent back beneath the second flange portion 16'''.

Test Data

In the two sets of tests reported below, the presently described construction is identified as "T-24+". In each test, the total volume of galvanized iron sheet was substantially the same as utilized in the TDF construction. Measurements were made at pressures ranging from 1" to 4" water column. Said test results were as follows:

Comparative Strength Tests for Joint Deflection
T-24+ VS. TDF

The following tests were performed in accordance with SMACNA HVAC duct construction standards.

First Series:

Ducts tested were 12" deep × 30" wide, made of 24 gauge galvanized iron.

| TDF | | T-24+ | |
|---|---|---|---|
| Operating Pressure | Deflection | Operating Pressure | ,26 Deflection |
| 1" water column | 0.005" | 1" water column | 0.005" |
| 2" water column | 0.014" | 2" water column | 0.012" |
| 3" water column | 0.021" | 3" water column | 0.014" |
| 4" water column | 0.030" | 4" water column | 0.020" |

Second Series:

Ducts tested were 12" deep × 60" wide, made of 20 gauge galvanized iron.

| TDF | | T-24+ | |
|---|---|---|---|
| Operating Pressure | Deflection | Operating Pressure | Deflection |
| 1" water column | 0.043" | 1" water column | 0.035" |
| 2" water column | 0.118" | 2" water column | 0.085" |
| 3" water column | 0.189" | 3" water column | 0.160" |
| 4" water column | 0.299" | 4" water column | 0.240" |

Summarizing, the first of these tests, for a 30" wide duct, the deflection utilizing the present flange proved to be about ⅓ less than when using the TDF flange; while in a duct section of 60" width, the deflection proved to be about 20% less.

Such reduced deflection was not to have been expected, because the 4(c) configuration is closer to the "virtual I beam" concept. The improved result may be attributable to the fact that the pressures responsible for the measured deflections also so stress the duct sheet material in tension as to make the flanged area more deflection-resistant than if subject to localized bending loads only.

Modifications may be made in the constructions herein described and illustrated without departing from the scope of the invention; thus it is intended that all matter contained in the foregoing description or shown in the accompanying drawings shall be taken as illustrative rather than limiting.

I claim:

1. For forming on a conventional progressive roll-forming equipment, an integral sheet metal safety flange for duct sections, comprising a first flange portion formed outward from and substantially perpendicular to the surface of such duct section, a second flange portion continuing from said first portion and bent back substantially parallel to the duct section surface, the extent of said second flange portion being substantially less than that of said first flange portion, a third flange portion of substantially the same extent as said second flange portion and being bent reversedly to said second portion and spaced therefrom not less than the thickness of such sheet metal, and a fourth flange portion bent reversedly inward from said third portion and presented substantially adjacent to an outer surface part of said second portion, said fourth flange portion constituting a margin of the sheet metal from which said flange is formed, the edge of which margin extends safely towards the reversed bend between said second and third flange portions.

2. An integral safety flange for sheet metal duct sections, comprising the flange defined in claim 1, wherein said fourth flange portion is of width selected from between a minimum, in which said flange terminates close to such bend inward from the third flange portion, and a maximum, in which it terminates close to such reverse bend from said second to said third flange portions.

* * * * *

UNITED STATES PATENT AND TRADEMARK OFFICE
CERTIFICATE OF CORRECTION

PATENT NO. : 5,358,013
DATED : October 25, 1994
INVENTOR(S) : Lamont R. McClain

It is certified that error appears in the above-identified patent and that said Letters Patent is hereby corrected as shown below:

In Column 3, line 54, delete ", 26"

Signed and Sealed this

Thirteenth Day of December, 1994

Attest:

BRUCE LEHMAN

*Attesting Officer*     *Commissioner of Patents and Trademarks*